United States Patent

McConnell

[15] 3,689,774
[45] Sept. 5, 1972

[54] LOAD HEIGHT SENSOR
[72] Inventor: Kennedy McConnell, Riverdale, Ill.
[73] Assignee: Interlake Steel Corporation,
[22] Filed: April 19, 1971
[21] Appl. No.: 135,436

Related U.S. Application Data

[63] Continuation of Ser. No. 843,423, July 22, 1969, abandoned.

[52] U.S. Cl............250/222 R, 214/16.4 A, 250/239
[51] Int. Cl...............................................H01j 39/12
[58] Field of Search..250/222, 223; 214/16.4 A, 16.4 R; 356/167, 156; 73/11, 141; 188/88

[56] References Cited

UNITED STATES PATENTS

| | | | |
|---|---|---|---|
| 3,219,207 | 11/1965 | Chasar | 214/16.4 A |
| 3,323,661 | 6/1967 | Chasar | 214/16.4 A |
| 3,348,049 | 10/1967 | Stacey | 250/223 B |
| 3,372,816 | 3/1968 | Atwater | 214/16.4 A |

*Primary Examiner*—James W. Lawrence
*Assistant Examiner*—D. C. Nelms
*Attorney*—Molinare, Allegretti, Newitt & Witcoff

[57] ABSTRACT

A load height sensor for sensing the height of loads on an elevated platform and which is retractile to prevent damage to the sensor includes a piston rod upon which the sensing elements are mounted, a piston having an orifice at one end of the rod, an elongated cylinder filled with liquid in which the piston and rod are moveable and a compressible gas bladder. When the piston rod contacts an overhead obstruction, the rod is pushed into the liquid filled cylinder and displaces a volume of the liquid to compress the bladder. When the rod is withdrawn from the obstruction, the rod is again fully extended by expansion of the bladder.

14 Claims, 2 Drawing Figures

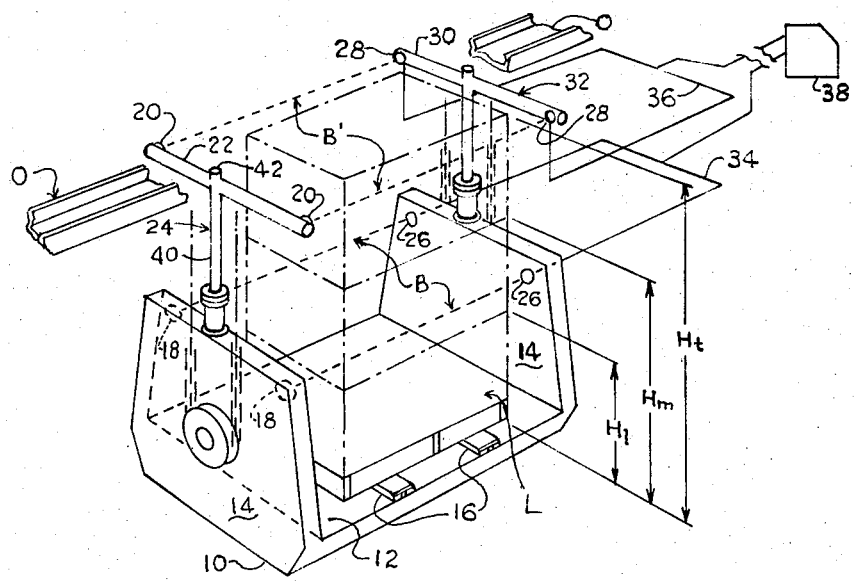
Fig_1
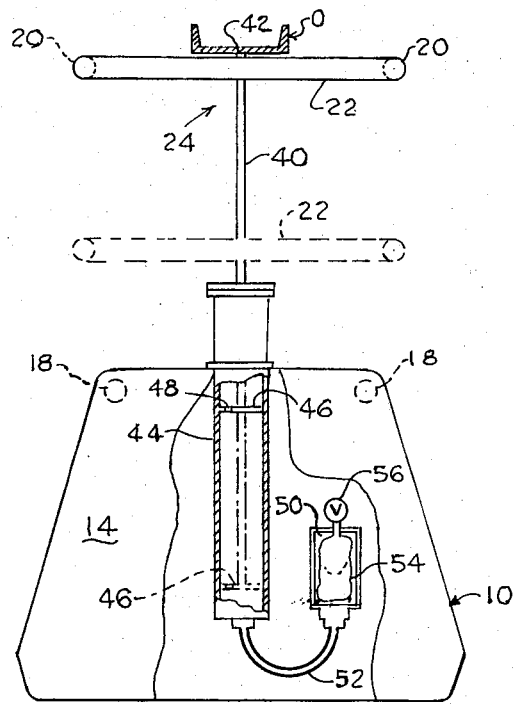
Fig_2
INVENTOR
KENNEDY McCONNELL
Bair, Freeman & Molinare
ATTORNEYS

LOAD HEIGHT SENSOR

BACKGROUND OF THE INVENTION

This application is a continuation of Ser. No. 843,423 filed July 22, 1969, now abandoned.

This invention relates to a load height sensor and, more particularly, to a load height sensing assembly for sensing the height of a load carried by an elevatable lift platform and which is retractile when the lift platform is elevated to maximum elevation.

In elevatable lift platforms, and particularly in lift platforms which form a part of load carriers of the type employed in mechanized storage and retrieval installations, it is desirable to employ some form of load height sensing means in order to prevent the insertion of articles which are to be stored into a storage bin which is too short to receive the articles. Such installations frequently have various sized storage bins and, for the purpose of space-saving economy, the various bins extend over substantially the entire height of the storage structure which houses the bins. In bin installations of mixed small, medium and large bins, the raising of the lift platform to its maximum elevation to store a load of short height in a small top bin might result in damage to the load height sensing elements due to collision either with the overhead of the load carrier itself or the overhead of the storage installation.

The load height sensor of my invention obviates the possibility of damage from overhead collision to such load height sensor elements while still providing a sensor assembly having the ability to sense the height of the tallest loads which are able to be accommodated by the installation. The load height sensor which incorporates the principles of my invention is automatically retractile from its normal tallest object sensing position when the sensor structure approaches a related structural obstruction and is automatically returned to its normal sensing position after the sensor structure has been withdrawn from the obstruction. The load height sensor of my invention is simple in construction and maintenance and yet obviates the possibility of damage to delicate sensor structure resulting from collision with related parts of the storage installation.

SUMMARY OF THE INVENTION

The load height sensor incorporating the principles of my invention includes a retractile sensing assembly comprising a piston rod upon which the sensing means or elements are mounted adjacent one end and which carries a piston at the other end. The piston and rod are movable axially within an enclosed cylinder between a position in which the piston rod extends substantially entirely from the cylinder and a position in which the piston rod extends for a substantial distance into the cylinder. Compressible means, which are responsive to the volume of the piston rod which extends into the cylinder, is provided for urging the piston rod toward its extended position.

These and other objects, features and advantages of the present invention will be more clearly understood through a consideration of the following detailed description.

BRIEF DESCRIPTION OF THE DRAWING

In the course of this description, reference will be frequently made to the attached drawing in which:

FIG. 1 is a perspective view of a load carrier lift platform having a preferred embodiment of load height sensor which is constructed in accordance with the principles of my invention; and FIG. 2 is an end elevation view of the lift platform and load height sensor shown in FIG. 1 and having portions thereof broken away.

DESCRIPTION OF THE PREFERRED EMBODIMENTS

A typical elevatable load carrier lift platform, generally 10, is shown in the drawing which comprises a flat horizontal bed 12 and a pair of upstanding end panels 14. A pair of forks 16 are positioned upon the upper face of the bed, the forks being telescopically extendible to either side of the lift platform for removing or inserting loads L of various heights, for example $H_1$, $H_m$, and $H_t$, into or from storage bins which are also of varied heights depending upon the height of the load which they are to accommodate. Such storage installations frequently include bins of varying sizes in order to most efficiently utilize the maximum volume of the storage installation. The structural details of several suitable load carriers are shown in copending U.S. Pat. application Ser. No. 766,673, filed Oct. 11, 1968.

In order to prevent insertion of a load which is too large for a respective bin, a load height sensor arrangement is provided on the end panels 14 of the lift platform. Such sensor arrangement preferably takes the form of a pair of medium level light sources 18 which are mounted upon one of the end panels and a second pair of high level light sources 20 which are mounted upon a crossarm 22 of a mast 24 and which are normally spaced above the top of the end panel. Both light sources 18 and 20 are positioned to direct their light across the length of the lift platform. A corresponding pair of medium level photoelectric cells 26 are mounted upon the other end panel directly opposite light sources 18 to receive the medium level light beams B emitted from the latter sources and a pair of corresponding high level photoelectric cells 28 are mounted upon the cross arms 30 of a second mast 32 to receive the high level light beams B' emitted from light sources 20. The cells 26 and 28 are mounted at substantially the same elevation as their respective light sources 18 and 20.

Each of the photoelectric cells 26 and 28 is connected by way of conductors 34 and 36 respectively to a control console 38 which receives the signals from the height sensing devices and displays a warning signal or otherwise controls the operation of the forks to prevent insertion of an oversized load into the improper bin. By way of example, if a previous order has been given to insert a load L which is presently positioned on the lift platform and which is of a height $H_t$ and the bin into which the load L is to be inserted is only able to accommodate a load of height $H_1$, the light beams B and B' from both sets of light sources 18 and 20 will be obstructed by the load. Blockage of the light beams generates a signal which is relayed to the console 38 to indicate that the load presently positioned on the platform cannot be so inserted. If the load L on the platform is of a height $H_m$, the light beams B are still obstructed between light sources 18 and photoelectric cells 26 to again generate a signal to indicate the improper order. If the load L which is positioned on the lift platform is of the proper size $H_1$, both light beams B and B' will be unobstructed and will activate cells 26 and 28 to generate a signal which indicates that the order may be carried out.

Since each of the light sources 18 and 20 and their respective photoelectric cells 26 and 28 are spaced as well as paired, appropriate signals will be generated even though the load L is not perfectly cubic. Where the load is non-cubic, one of the beams B and/or B' will at least be blocked where any portion of the load exceeds height $H_m$ or $H_t$ when the forks 16 move the load either to the right or left across the beams.

Since the crossarms 22 and 30 are positioned a substantial distance above the top of their respective end panels 14, the delicate light sources 20 and cells 28 mounted on the crossarms are susceptible to damage when the lift platform 10 is elevated to its maximum elevation due to the possibility of collision with the related overhead structure of the load carrier or other overhead structures of the storage installation, indicated generally by 0.

To prevent such damage, the masts 24 and 32 are retractile into the end panels of the lift platform. For this purpose, the crossarm of each mast is positioned near but slightly below the top end of a non-rotatable piston rod 40. One end 42 of the piston rod 40 extends slightly above the crossarm and the other end extends downwardly into an enclosed sealed cylinder 44. A piston 46 is carried upon the opposite end of the piston rod 40 and is reciprocal within the cylinder such that it may assume several positions as indicated by the solid and the dot and dash lines in FIG. 2. A bleed orifice 48 extends between the opposite faces of the piston to allow liquid which fills the cylinder to communicate between each side of the piston upon movement thereof.

A sealed reservoir 50 is also provided preferably within the end panel of the lift platform and communicates with the cylinder 44 by way of a conduit 52. A flexible bladder 54 is located within the reservoir and is pressurized with gas at a predetermined pressure sufficient to pressurize the entire liquid system by way of a valve fitting 56.

In operation, the piston 46 is normally urged upwardly to the top of the cylinder 44 by the pressure provided by the gas in bladder 54 which is transmitted through the liquid in the system to the lower face of the piston and also the upper face of the piston by way of bleed orifice 48. Since the area of the upper face of piston 46 is reduced by the area of the piston rod 40, a net upward force is exerted upon the lower larger face of the piston to extend the piston rod 40 and its crossarm 22 to the maximum elevation and into its normal load height sensing position as shown in FIG. 1.

However, when the lift platform 10 is elevated to a height wherein the masts 24 and 32 contact an overhead obstruction O, the tip 42 of the piston rod 40, which is preferably extended slightly above the crossarm of each mast to avoid direct contact of the crossarm with the overhead obstruction, contacts the obstruction O as shown in FIG. 2. Now as elevation of the lift platform continues, a downward force is exerted upon the piston rod 40 moving the rod progressively into the cylinder 44 and moving the piston downwardly as indicated by the solid and the dot and dash lines in FIG. 2. The pressure of the liquid, however, is not appreciably increased by the movement of the piston, since the liquid on the lower side of the piston freely communicates with the upper side through the bleed orifice 48, effectively causing a simple displacement of the liquid from one side of the piston to the other. However, as the rod progressively enters the closed cylinder 44, it will displace a progressively increasing volume of liquid equal to the volume of the rod which has entered the cylinder. Since the system is closed, this volume of liquid will be forced through the conduit 52 into reservoir 50 compressing the gas filled bladder 54.

As the lift platform is again lowered away from the overhead obstruction O, the pressure in the system due to the pressurized bladder 54 will again act upon the lower face of the piston 46 and urge the piston and its rod 40 upwardly and the gas filled bladder will expand to force the previously displaced liquid from the reservoir back through the conduit 52 and into the cylinder 44. The crossarms are thereby re-elevated automatically to their normal operating height.

It should be understood that the embodiment of the present invention which has been described is merely illustrative of one of the applications of the principles of the invention. Numerous modifications may be made by those skilled in the art without departing from the true spirit and scope of the invention.

I claim:

1. A retractile sensing assembly for sensing the presence or absence of an object comprising;
   an elongated piston rod having sensing means mounted adjacent one end for sensing the presence or absence of the object,
   an elongated closed cylinder having fluid therein,
   a piston carried upon the other end of said piston rod, said piston and said piston rod being moveable axially in said cylinder between a first position in which said piston is positioned adjacent one end of said cylinder and said piston rod extends substantially entirely from said cylinder and a second position in which said piston is positioned toward the other end of the cylinder and said piston rod is progressively enclosed within said cylinder in response to a force exerted on said one end of said piston rod, the volume of said enclosed portion of said piston rod displacing a portion of the fluid in said cylinder, and
   compressible means responsive to and receiving said displaced portion of said fluid for urging said piston rod toward said first position.

2. The assembly of claim 1 wherein said cylinder is substantially filled with liquid and said compressible means comprises a gas filled chamber in pressure transmitting communication with said liquid whereby the volume of liquid which is displaced by said piston rod compresses the gas in said chamber to urge said piston rod toward said first position.

3. The assembly of claim 2 wherein said gas filled chamber comprises a flexible bladder positioned in said liquid.

4. The assembly of claim 2 wherein said piston includes a bleed means communicating between the opposite sides of said piston.

5. The assembly of claim 1 wherein said compressible means comprises a closed reservoir communicating with said cylinder and a sealed flexible bladder filled with gas positioned in said reservoir, said cylinder and said reservoir being substantially entirely filled with liquid.

6. In a load carrier elevatable lift platform which is adapted to be positioned adjacent different storage bins of a storage installation for inserting and removing a load into and from the storage bins, a retractile sensing assembly for sensing the height of the load, said assembly comprising;
   a fluid filled elongated closed cylinder mounted on the lift platform,
   a mast having sensing means mounted adjacent one end thereof above said lift platform for sensing the height of a load which is positioned on said platform, the other end of said mast including a piston rod which moveably extends into said cylinder and having a piston thereon, said piston rod and piston being axially moveable in said cylinder in response to contact of said mast with load carrier related structure to enable said sensing means to move elevationally relative to said lift platform, and
   compressible means for receiving the volume of fluid in said cylinder which is displaced by movement of said other end of said mast into said cylinder, said compressible means urging said mast upward of said lift platform.

7. In the load carrier of claim 6, wherein said compressible means comprises a gas filled chamber in pressure transmitting communication with the fluid in said cylinder and said piston includes a bleed means communicating between opposite sides of said piston.

8. In the load carrier of claim 6, wherein said sensing means comprises a pair of spaced sensing beam generating means, whereby the height of non-cubic loads may be sensed.

9. In the load carrier of claim 6, wherein said sensing means includes photoelectric means.

10. In a load carrier elevatable lift platform adapted to be positioned adjacent different storage bins of a storage installation for inserting and removing a load into and from the storage bins, a retractile sensing assembly for sensing the height of the load comprising;
    load height sensing means mounted on retractile means positioned on a lift platform,
    said retractile means normally positioned to position the load height sensing means in its highest position above the lift platform,
    force means associated with the retractile means to urge the retractile means and the load height sensing means mounted thereon upward of said lift platform,
    said retractile means withdrawing against said force means relative to upward movement of the lift platform in response to interference of the upward movement of the load height sensing means as the lift platform is elevated, to thereby permit additional elevation of the lift platform without additional elevation of the load sensing means.

11. A retractile sensing assembly for sensing the presence or absence of an object comprising;
    an elongated piston rod having sensing means mounted adjacent one end for sensing the presence or absence of the object,
    an elongated closed cylinder
    a piston carried upon the other end of said piston rod, said piston and said piston rod being moveable axially in said cylinder between a first position in which said piston is positioned adjacent one end of said cylinder and said piston rod extends substantially entirely from said cylinder and a second position in which said piston is positioned toward the other end of the cylinder and said piston rod is progressively enclosed within said cylinder in response to a force exerted on said one end of said piston rod, and
    compressible means responsive to the volume of said piston rod which is enclosed within said cylinder for urging said piston rod toward said first position, said cylinder being substantially filled with liquid and said compressible means comprising a gas filled chamber in pressure transmitting communication with said liquid, whereby the volume of liquid which is displaced by said piston rod compresses the gas in said chamber to urge said piston rod toward said first position.

12. The assembly of claim 11 wherein said gas filled chamber comprises a flexible bladder positioned in said liquid.

13. The assembly of claim 11 wherein said piston includes a bleed means communicating between the opposite sides of said piston.

14. A retractile sensing assembly for sensing the presence or absence of an object comprising;
    an elongated piston rod having sensing means mounted adjacent one end for sensing the presence or absence of the object,
    an elongated closed cylinder,
    a piston carried upon the other end of said piston rod, said piston and said piston rod being moveable axially in said cylinder between a first position in which said piston is positioned adjacent one end of said cylinder and said piston rod extends substantially entirely from said cylinder and a second position in which said piston is positioned toward the other end of the cylinder and said piston rod is progressively enclosed within said cylinder in response to a force exerted on said one end of said piston rod, and
    compressible means responsive to the volume of said piston rod which is enclosed within said cylinder for urging said piston rod toward said first position, said compressible means comprising a closed reservoir communicating with said cylinder and a sealed flexible bladder filled with gas positioned in said reservoir, said cylinder and said reservoir being substantially entirely filled with liquid.

* * * * *